Figure 1:
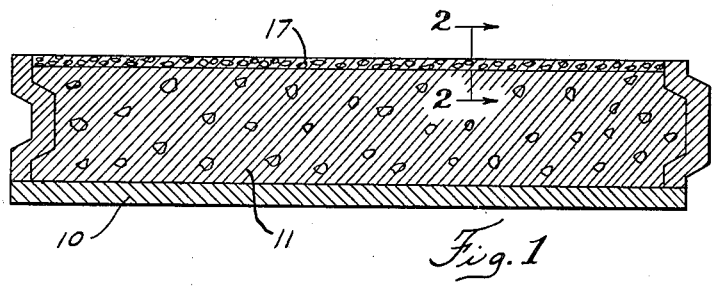

Feb. 25, 1941.   W. O. BRASSERT   2,232,837

METHOD OF FORMING CONCRETE WALL MEMBERS

Filed Jan. 26, 1940

INVENTOR
WALTER O. BRASSERT,
BY Minturn & Minturn,
ATTORNEYS

Patented Feb. 25, 1941

2,232,837

UNITED STATES PATENT OFFICE 2,232,837

METHOD OF FORMING CONCRETE WALL MEMBERS

Walter O. Brassert, Bloomfield, Ind.

Application January 26, 1940, Serial No. 315,661

5 Claims. (Cl. 25—155)

This invention is a continuation in part of my application filed in the U. S. Patent Office, March 3, 1938, Serial No. 193,668, and relates to building wall members and particularly to a silo wall member, made of concrete, or cement and some suitable aggregate. When the wall member is to be employed in a silo, it is exposed to a wide range of temperature changes, and its interior face is subjected to the acids of the ensilage. It has been the experience that where the face portion of the concrete wall member is made in the usual manner, deterioration sets in due to the acid reactions in the wall member causing the surface of that member to be etched away.

For the purpose of structural strength and economy, the concrete wall member is made of cement as a binder and aggregate such as gravel, crushed rock or the like, and this etching action is particularly noted about the aggregate particles.

Heretofore in order to overcome this difficulty, the surface portions of the wall member have been coated with some sort of an acid repellent or acid resistant material so as to withhold the acids from contact with the wall member. This mode of treatment works entirely satisfactorily as long as the material may be held in contact with the wall member. It sometimes occurs, however, particularly in cold weather, that the coating material will contract and loosen or chip off. If it were economical and structurally sound so to do, the wall member could be made out of cement alone without an aggregate combined therewith and such a wall member would be very resistant to the action of the acids of the ensilage. The acids would tend to permeate the zone of the wall member immediately adjacent the inner or face surface but this penetration would become negligible in very short order due to the fact that, what little reaction may occur, soon becomes stopped on account of the fact that the salts produced will clog up the minute pores of the cement and in themselves form a good acid seal. Since in this case there is no aggregate present, there would be no loosening effect as between the cement bond and the aggregate to set up the chipping or etching action resulting in the customary spalling of the wall member. However, as above indicated, it is neither practical nor economical to make the wall member solely of cement and, therefore, the cement and aggregate concrete must be protected in some manner.

It is a primary object of my invention to provide a protective zone adjacent the face of the wall member which is normally presented toward the ensilage, and to create such a zone as will become permanent in nature as an acid resisting medium as well as a medium preventing any appreciable degree of acid penetration. It is a further primary object of my invention to provide as a structural part of the wall member rather than as an after application, an acid resistant film to be incorporated directly within the concrete and to be so sealed therewithin as to prevent loss of that material due to weather conditions or temperature changes.

Figure 3:
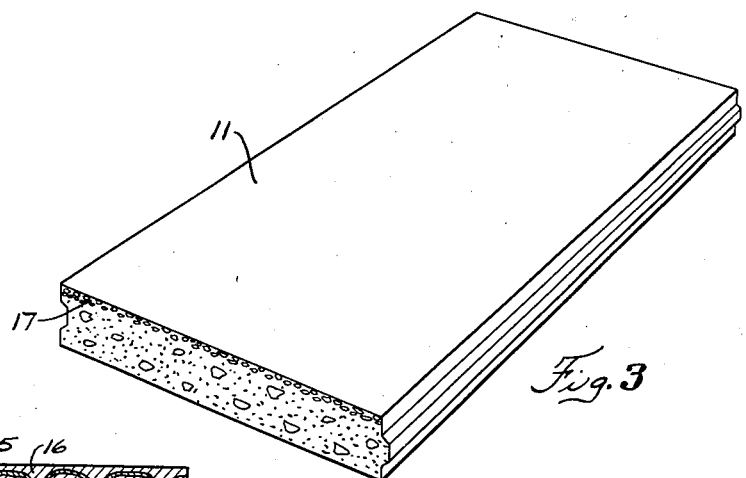
Figure 2:
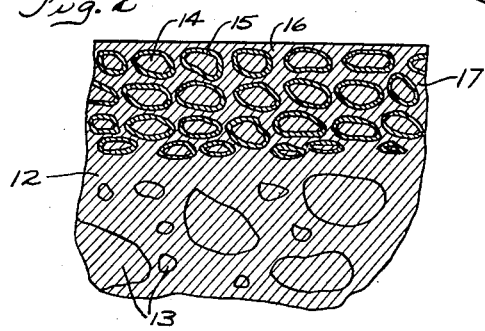

These and many other objects and advantages of the invention will become apparent to those versed in the art in the following description of one particular form of the invention as is illustrated more or less diagrammatically in the accompanying drawing, in which:

Fig. 1 is a vertical section through a wall member within a mold;

Fig. 2, a detail on a greatly enlarged scale of a section through the inner face portion of the wall member on the line 2—2 in Fig. 1;

Fig. 3, a view in top perspective of a finished wall member; and

Figure 4:
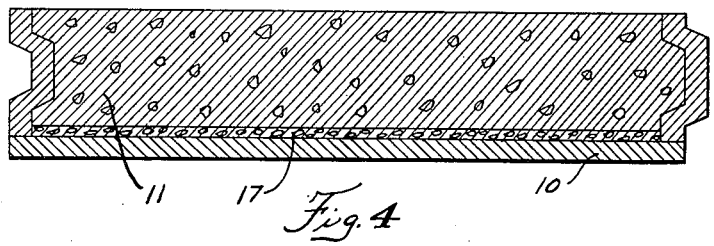

Fig. 4, a section similar to that shown in Fig. 1 but with the finished surface presented at the bottom of the mold.

Like characters of reference indicate like parts throughout the several views in the drawing.

In the present instance, the wall member 11 being described is that as employed in a silo wherein the thickness would be about two and one-half inches and the width about twelve and one-half inches with any desired length such as two and one-half feet. Preferably the member for this use would be provided with a groove on one side and a tongue on the other for matching when the members are placed one against the other, edge to edge to form the silo.

In a suitable mixing mill, sand is heated to a temperature above the melting point of the material to be employed as the acid resisting medium. Paraffin wax is easily handled, is sufficiently low in price to permit its economical use, and has certain qualities as will hereinafter become apparent to be an excellent acid resisting medium. To the heated sand is added the melted wax in the desired proportions. This will depend somewhat upon the size of the individual grains of sand, but in practice one particular proportion is one part by volume of wax to twelve parts of sand. As the wax is mixed through the heated sand, the wax distributes itself throughout the same almost immediately and uniformly with little stirring being required. Approximately two minutes is sufficient to complete the wax coating of the sand.

The sand thus coated and mixed with the wax is then dumped while hot into a revolving drum mixer which has already been charged with water and cement. The resultant mixture of sand, wax, cement and water is churned and mixed for about four minutes until a smooth uniform mortar is obtained.

The foregoing mixture is then ready for use for the facing layer 17 in the mold 10. However, this facing mixture may be prepared also in the following manner. The sand may be initially heated and then placed with cement in the usual concrete mixer to be thoroughly mixed in the dry state for some such period as one minute. Then while the mixer is turning, hot paraffin is added and the mixer continued in operation for a period of about three minutes. The resultant mixture of sand, cement, and paraffin, while still in the heated state, is transferred to a paddle mixer which contains water. The paddle mixer is operated for about six or seven minutes. One particular proportion of ingredients, although the invention is not to be limited thereby, is as follows: equal parts of cement and sand by volume (a cement bag of sand to one bag of cement), fifteen pints of paraffin, and only enough water to provide a resultant mixture as will vibrate down to a level within the mold.

The mixture resulting from either procedure is then ready for use in the mold 10. The ensuing steps in the molding process may differ. For example, as indicated in Fig. 1, the usual concrete constituting the principal part of the member 11 may be placed in the mold 10 first and vibrated down to a level to leave an upper portion of the mold into which the paraffin mixture above prepared may be poured and trowelled to a level substantially at the top edges of the mold. This method forms a face layer at the top side of the mold. The other procedure is to place the resultant paraffin mixture in the mold initially, as indicated in Fig. 4, and vibrate that mixture to a level across the mold floor and then add the principal body concrete mixture thereover and vibrate it to the level of the top of the mold. In filling the mold with the body concrete on top of the facing, the ends of the mold are filled first over the facing mixture.

As illustrated more or less diagrammatically in Fig. 2, the upper side of the section of the member 11 constitutes the inside face of the member when it is positioned in the silo wall. In this section, the major part of the thickness of the wall member is represented by the concrete 12 having the particles of aggregate 13 distributed therethrough and bonded in the usual way by cement. The facing zone 17 is represented by the smaller particles of sand 14 each having a coating of wax 15 therearound with cement 16 flowed therebetween and down into an intimate, integral bond with the concrete 12. It is appreciated that the majority of the particles of sand 14 will not be directly contacted or bonded with the cement therearound but each particle of sand 14 will be separated from that cement by reason of its enveloping film of wax 15. This introduction of films around the sand particles in the facing zone forms the gist of the invention.

Since each particle of sand is isolated from the cement by the film of wax therearound, acids coming into the cement from the face by capillary action do not come into contact with the sand particles. Moreover by reason of the fact that the cement is actually kept separate from the sand particles, the capillaries in this facing zone are extremely small and are easily clogged before the acids can penetrate very far. The wax film about each sand particle, of course, resists any invasion of the acid and moreover, particularly after the silo member has been exposed to the weather through a summer, this film upon becoming heated again will actually tend to spread through the fine capillaries in and about the sand and form a more or less continuous zone of wax through this facing portion so that in time the film of wax becomes somewhat distributed even through the cement intervening between the sand particles. Moreover when the weather becomes cold, the wax tends to shrink at a greater rate than does the sand and cement, but the wax can not escape and be removed from the facing zone by friction and wear since it is entrapped within the shell-like spaces between the cement and each grain of sand. Therefore, when the weather warms up again, or when the wall members become warmed by the heat transmitted from the fermenting ensilage, the wax is still there and upon expansion will refill that spacing.

In other words, by reason of the unique manner of introducing the wax into the facing zone of the wall member, the wax is not only placed more deeply into the zone than it would be if it were merely painted or spread on the surface, but the wax is placed there in a permanent fashion without danger of being scraped off, cracked off by shrinking, or otherwise lost.

Referring again to the method forming the individual member, the cast member is left in the mold until it is hardened sufficiently that it may be removed without damage. The removed member is then cured in the usual manner. Incidentally by reason of the presence of the facing surface zone, the water does not leave the member as quickly as it would otherwise and, therefore, good curing conditions are extended in a very beneficial manner.

Also it is to be noted that there is an actual saving of labor in preparing the wall member in the manner stated in that the wax may be introduced into the wall member as described with less labor than it could be by first putting the member through a heating operation and then immersing it in molten wax so that the wax may penetrate the pores or capillaries of the member, as has been done heretofore. While the process has been described in reference to a silo wall member, it is, of course, well adapted to other concrete members such as building blocks and the like where a water resistant surface zone is desirable as well as an acid resisting zone.

While I have herein shown and described my invention in minute detail, it is entirely obvious that changes may be employed therefrom without departing from the spirit of the invention and I, therefore, do not desire to be limited thereby beyond the limitations as may be imposed by the following claims.

I claim:

1. That method of forming a concrete wall member which comprises molding the major thickness of the member, heating and coating a mass of aggregate particles with a paraffin wax film, mixing the film coated particles with cement and water, applying the resultant mixture to a face of said member to form a zone of appreciable thickness thereon, the cement of the mixture bonding with the concrete of the member to form a resultant integral rigid member having a surface zone with individual film coated aggregate particles separated by a cured cement bond therearound and between adjacent particles.

2. That method of forming a concrete silo wall member which consists of mixing water, cement and aggregate to form concrete, pouring the concrete into a horizontally disposed mold to a level slightly below the top of the mold, settling and leveling the concrete to bring its upper face into a horizontal plane, heating a mass of sand, pouring liquefied paraffin wax into the mass in sufficient amount to thoroughly coat each particle of sand with a wax film, mixing the coated sand while hot with cement and water to a smooth condition, placing the sand-wax-cement-water mixture over said face in the mold to fill the mold, and allowing the resultant member to set and cure.

3. That method of forming a concrete silo wall member which consists of heating a mass of sand, liquefying a mass of paraffin wax, mixing the wax and sand together while hot in sufficient proportions to apply an enclosing wax film about each sand particle, dumping the waxed sand while hot into a mixture of water and cement to disperse the wax coated particles therethrough, applying a layer of the resultant mixture over the floor of a silo member mold to form a face coating portion thereof, filling the mold over the face portion with a mixture of cement and aggregate, and allowing the cast to cure and dry into a rigid unified member.

4. In a method of forming an acid resisting facing for a concrete wall member which includes preparing a mixture of aggregate, cement and water, those steps which consist of heating and mixing the aggregate and cement together in the absence of the water, mixing liquefied paraffin with the hot aggregate and cement mixture, adding water thereto, and bringing into intimate contact therewith a body of mixed aggregate, cement and water to form the backing for said facing mixture.

5. In a method of forming an acid resisting facing for a concrete wall member which includes preparing a face mixture of aggregate, cement and water, those steps of heating one ingredient of said mixture in the absence of the water, mixing liquefied paraffin with that ingredient, mixing the other ingredient therewith and the water, and backing up that resultant mixture in intimate bonding contact with a mixture of aggregate, cement and water, and allowing the mass to cure into a unitary member.

WALTER O. BRASSERT.